US007744799B2

(12) United States Patent
Braeckman et al.

(10) Patent No.: US 7,744,799 B2
(45) Date of Patent: Jun. 29, 2010

(54) METHOD FOR MANUFACTURING AT LEAST A SURFACE LAYER OF MULTILAYERED TRIM PART

(75) Inventors: André Braeckman, Wetteren (BE); Jan Willems, Wetteren (BE); Yvan Vanluchene, Wetteren (BE); Hugo De Winter, Wetteren (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 209 days.

(21) Appl. No.: 11/914,585

(22) PCT Filed: May 16, 2006

(86) PCT No.: PCT/EP2006/062327

§ 371 (c)(1),
(2), (4) Date: Dec. 20, 2007

(87) PCT Pub. No.: WO2006/122928

PCT Pub. Date: Nov. 23, 2006

(65) Prior Publication Data

US 2008/0191383 A1 Aug. 14, 2008

(30) Foreign Application Priority Data

May 17, 2005 (EP) .................................. 05104079

(51) Int. Cl.
*B29C 41/20* (2006.01)
*B29C 43/18* (2006.01)
*B29C 45/00* (2006.01)
*B29C 41/22* (2006.01)

(52) U.S. Cl. ........................ 264/255; 264/245; 264/246; 264/263; 264/302

(58) Field of Classification Search ....................... None
See application file for complete search history.

(56) References Cited

U.S. PATENT DOCUMENTS 4,562,025 A * 12/1985 Gray ........................... 264/126

(Continued)

FOREIGN PATENT DOCUMENTS

DE 100 62 825 A1 6/2002

(Continued)

OTHER PUBLICATIONS

Patent Abstracts of Japan, vol. 008, No. 270, Dec. 11, 1984.

(Continued)

*Primary Examiner*—Edmund H. Lee
(74) *Attorney, Agent, or Firm*—Sughrue Mion, PLLC

(57) ABSTRACT

The method according to the invention is a moulding method wherein a first layer (21), having a first colour, is produced against a first portion of a mould surface (10) and wherein, in a next step, a second layer (22), having a second colour, is produced against a second portion of the mould surface (10) and at least partially against the back of the first layer (21). The method is intended to obtain a qualitative transition between the colours of the two layers (21, 22) without having to hide the actual colour transition in a groove from view. This object is achieved by applying the material forming the first layer (21) in such a manner on the mould surface (10) that the edge (20) of the first layer (21), which will be situated on the mould surface underneath the second layer (22), is visually sharp and is produced without a mask.

26 Claims, 5 Drawing Sheets

U.S. PATENT DOCUMENTS 5,073,325 A     12/1991    Gray et al.
6,071,619 A *    6/2000    De Winter ............... 428/423.1
7,462,314 B2 *   12/2008    Feick ......................... 264/255

FOREIGN PATENT DOCUMENTS

| | | |
|---|---|---|
| EP | 1 321 269 A1 | 6/2003 |
| JP | 59 127718 | 7/1984 |
| JP | 59 142112 | 8/1984 |
| JP | 59-185619 | 10/1984 |
| JP | 10-225946 | 8/1998 |

OTHER PUBLICATIONS

Patent Abstracts of Japan, vol. 009, No. 045, Feb. 27, 1985.
Patent Abstracts of Japan, vol. 1998, No. 13, Nov. 30, 1998.
Patent Abstracts of Japan, vol. 008, No. 253, Nov. 20, 1984.

* cited by examiner

METHOD FOR MANUFACTURING AT LEAST A SURFACE LAYER OF MULTILAYERED TRIM PART

BACKGROUND OF THE INVENTION

The present invention relates to a method for manufacturing at least a surface layer of a multilayered trim part for attachment to a structure of a vehicle, which surface layer has a front side formed at least partially by a first surface portion, which has a first colour, and by a second surface portion, which is situated at least partially against the first surface portion and which has a second colour different from the first colour. The surface layer is in other words a two- or multicolour surface layer. The method for manufacturing such a surface layer is a moulding method wherein a first layer forming the first surface portion is produced against a first portion of a mould surface while leaving a second portion of the mould surface free for producing, in a next step, a second layer forming the second surface portion against the second portion of the mould surface and at least partially also against the back of the first layer.

The multilayered trim part is for example a dashboard, a door panel, a console or another interior trim part of an automotive vehicle. Usually it consists of the surface layer bonded by means of an intermediate foam layer to a rigid substrate layer. The surface layer may consist of an elastomeric skin layer either or not provided with a thinner coloured layer, in particular a paint layer. In the method according to the invention the skin layer is moulded against a mould surface. If it is covered by an additional coloured coating layer, this coating layer is first applied, as an in-mould coating, onto the mould surface.

The surface layer can be made for example by means of a spray or a pouring process wherein a curable skin material, in particular a polyurethane reactive mixture, is sprayed or poured in a liquid state onto the mould surface. Such a method is disclosed in EP-B-0 804 327. In this known method a first layer forming material, more particularly a polyurethane reactive mixture having a first colour, is sprayed first onto a first portion of the mould surface while shielding off a second portion of the mould surface by means of a mask. In a next step, the mask is removed and a second layer forming material, again a polyurethane reactive mixture but having a second colour different from the first colour, is sprayed onto the second portion of the mould surface and partially onto the back of the previously sprayed polyurethane layer. The first layer forming material thus has an edge which is situated underneath the layer of the second layer forming material and which defines the colour transition between the first and the second surface portion of the surface layer.

A drawback of this known method is that the transition between the two colours is not always sufficiently sharp, due to sputtering or scattering of the polyurethane reactive mixture underneath the mask. EP-B-0 804 327 therefore discloses to provide the transition between the two colours onto an upstanding ridge of the mould surface in order to hide the transition zone between the two colours from view. The actual colour transition is then indeed located in a groove in the surface layer of the trim part. However, due to the width of the groove, it still remains somewhat visible so that a need remains to achieve a sharp transition between the different colours.

DE-A-100 62 825 provides an improvement of the method disclosed in EP-B-0 804 327. In the method disclosed in this German patent application, the surface layer is produced by spraying a first paint layer onto a first portion of the mould surface, by spraying a second paint layer onto a second portion of the mould surface and partially onto the back of the first paint layer, by pouring a polyurethane reactive mixture onto the back of both paint layers and by closing the mould to allow the polyurethane reactive mixture to cure in a closed mould. When spraying the first paint layer, the second portion of the mould surface is covered by means of a mask. Notwithstanding the fact that a mask is used to cover the second portion of the mould surface and hence to define the edge of the first paint layer, DE-A-100 62 825 discloses it is difficult to achieve a clear and sharp dividing line between the two colours. DE-A-100 62 825 therefore also describes to produce the transition between the two colours on top of an upstanding ridge. The improvement proposed by DE-A-100 62 825 consists in reducing the width of the thus obtained groove on the visible side of the surface layer. This is achieved by transferring the surface layer to a second mould wherein the upstanding ridge is replaced by a thin upstanding sheet. In this second mould a foam layer is moulded onto the back of the surface layer. A drawback of this method is that it does not allow a direct back-foaming process and that a second, expensive mould is therefore always required to perform the back-foaming process.

Another method making use of the mask technology to produce a multicoloured trim part, is disclosed in US-A-2004/0099988. In this method, a first paint layer is sprayed onto a first portion of the mould surface and a second paint layer on a second portion of the mould surface, which was covered with a magnetically securing mask when spraying the first paint layer. A third material, usually a polyurethane material, is then applied, usually sprayed, over the first and second paint layers to form a backing layer. In this known method the transition between the two colours is also produced on top of an upstanding ridge to hide the colour transition from view.

A drawback of the prior art methods set forth hereabove is that, due to the use of a mask, defects arise at the transition or parting line between the different colours, i.e. either some of the first layer forming material will arrive onto the second mould surface portion when removing the mask, this is the so-called bridging problem, or, when such bridging is avoided by maintaining a distance between the mould surface and the edge of the mask, some of the first layer forming material will arrive underneath the edge of the mask causing a scattered transition zone between the different colours. The use of upstanding ridges on the mould surface, to hide these colour transition zones from view, involves an important limitation of the design possibilities. Moreover, the use of upstanding ridges do not enable flat colour transitions. A further drawback of the prior art methods is that the used mask technology is critical and complex. In order to get the colour transition line as good as possible, the mask geometry has to be tailored accurately to the three-dimensional shape of the mould surface and in particular to the geometry of the upstanding ridges. Any deviation in both geometries will be translated in inaccurate colour transitions.

A method wherein a surface layer for a trim part is produced without the use of a mask is disclosed in U.S. Pat. No. 5,328,349. In this known method a multicoloured slush skin is produced by a powder-slush process. According to this US patent, masking techniques can be used for producing multicoloured slush skins but it has been shown in actuality that the separating seam looks untidy to the eye. In the disclosed method, the entire mould surface is therefore first covered with a first thermoplastic material, a portion of produced slush skin is cut out and removed from the mould surface and a second thermoplastic material is moulded onto the free mould surface and onto the back of the first thermoplastic material. An important drawback of such a method is that it is only applicable for thermoplastic materials. Moreover, it is a quite complex process and, in the disclosed method, the actual colour transition has still to be produced on top of an upstanding edge.

Other methods which are only applicable for thermoplastic materials are disclosed in JP 59142112 and in U.S. Pat. No. 5,073,325. In these known methods a pattern recessed in the mould surface is first filled up with a thermoplastic material. In a next step, the entire mould surface is covered with a second thermoplastic material so that the front side of this second thermoplastic material has a decorative feature formed by the first thermoplastic material. A drawback of these methods is also that the first thermoplastic material has to be applied always in a pattern recessed in the mould surface and, moreover, after having applied the first material in the recessed pattern, any excess of material outside the recessed pattern has to be removed. A further drawback of these known methods are the limited design possibilities due to the fact that the second thermoplastic material extends always on both sides of the decorative feature. It is thus for example not possible to produce a surface layer consisting of two main surface area's of different colours.

SUMMARY OF THE INVENTION

An object of the present invention is now to provide a new method which enables to obtain a qualitative transition between the different colours without having to hide the actual colour transition in a groove or in any other way from view and without having to cut out a portion of the first layer forming material before applying the second layer forming material onto the mould surface.

The method according to the invention is characterised hereto in that when applying the first layer forming material onto the first portion of the mould surface, at least a portion of the edge of the layer of the first layer forming material, which will be situated on the mould surface underneath the layer of the second layer forming material, is formed without a mask. Moreover, a layer of a third layer forming material, which is hardenable and has a third colour which is different from the second colour, is applied onto a third portion of the mould surface, which is separated at least locally by the first portion of the mould surface from the second portion thereof, and the layer of the third layer forming material is allowed to harden to produce a third layer forming a third surface portion of the surface layer which is separated at least locally by the first surface portion of the surface layer from the second surface portion thereof, the layer of the third layer forming material being either applied onto the mould surface before applying the layer of the first layer forming material thereon, in which case the first layer forming material is applied at least partially onto the back of the layer of the third layer forming material, or after having applied the layer of the first layer forming material thereon, in which case the third layer forming material is applied at least partially onto the back of the layer of the first layer forming material.

In the prior art methods wherein the second portion of the mould surface is kept free of the first layer forming material when applying this material onto the first portion of the mould surface, use is always made of a mask for shielding off the second portion of the mould surface and for defining the edge of the first layer.

In a first aspect of the invention, the first colour is substantially the same as the third colour. In this way, there is no visible difference between the first and the third surface portion. An advantage of this embodiment is that only a quite narrow strip of the first layer forming material has to be applied, which can be done quite accurately, in particular so that a visually sharp edge can be obtained, without intervention of a mask, when applying the first layer forming material. Since the required visually sharp edge between the two colours is already achieved by means of the first layer forming material, the third layer forming material can be applied easily over a larger surface (for example by spraying).

In a second aspect of the invention, it has been found that the disadvantages of the prior art methods can be obviated by applying the first layer forming material in such a manner on the mould surface that a visually sharp edge, as defined in the claims, is produced without the use of a mask to define this edge. A visually sharp edge means that, when looking at it in normal daylight from a distance of about 30 cm, the edge appears to be sharp, i.e. without a gradual transition between both colours. A person skilled in the art knows different ways wherein such a visually sharp edge can be achieved without the use of a mask. The first layer forming material can be applied for example by brushing, painting, rolling, writing (with a pen-like instrument) or printing (for example by flexography or by ink jet printing) or even by spraying or pouring if this is done from a sufficiently small distance (and at a sufficiently low pressure or flow rate) from the mould surface.

In a preferred embodiment of the method according to the invention, the first layer forming material is a water or solvent based paint which is applied in a layer having preferably an average thickness smaller than 300 µm, more preferably smaller than 100 µm.

An advantage of this embodiment is that, due to the relatively low viscosity of such paints, usually a viscosity lower than 1000 mPa·s (at 25° C.), they can be applied more easily according to the desired pattern, delimited by visually sharp edges, onto the mould surface.

DESCRIPTION OF THE FIGURES

Other particularities and advantages of the invention will become apparent from the following description of some particular embodiments of the method according to the present invention. The reference numerals used in this description relate to the annexed drawings wherein.

DESCRIPTION OF THE PREFERRED EMBODIMENT

Figure 7:
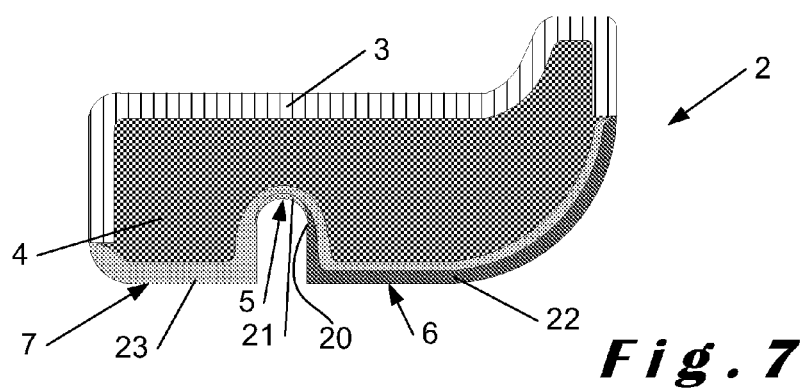
FIG. 7 schematically shows a cross-sectional view of the trim part produced by the method illustrated in the previous figures.

In the method according to the invention at least a surface layer 1 of a multilayered trim part 2, arranged to be attached to a structure of a vehicle, is produced. The trim part 2 is more particularly an interior trim part such as a dashboard, a door panel, a console, a lid of a glove compartment, etc. In addition to the surface layer 1, the trim part 2 comprises a rigid substrate 3. This substrate 3 may be glued to the back of the produced surface layer 1. However, as illustrated in FIG. 7, the trim part 2 usually comprises an intermediate foam layer 4 connecting the surface layer 1 to the rigid substrate layer 3 and providing a so-called soft-touch. The surface layer is preferably flexible or semi-flexible.

Figure 8:
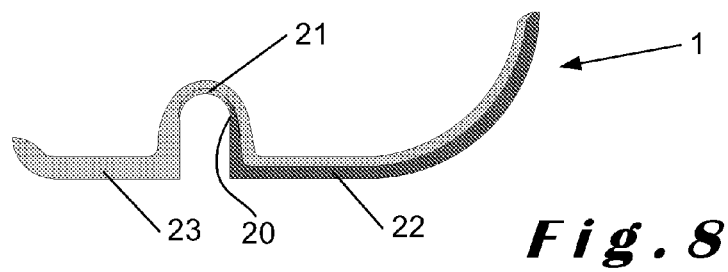
FIG. 8 schematically shows a cross-sectional view of the surface layer of this trim part produced by the method illustrated in FIGS. 1 to 4.

A preferred embodiment of the multicoloured surface layer 1 and trim part 2 which can be produced by means of the method according to the invention is illustrated in FIGS. 7 and 8. The illustrated surface layer 1 has a front side formed by a first surface portion 5 having a first colour, by a second surface portion 6 having a second colour, and by a third surface portion 7 having a third colour. The first surface portion 5 is situated at least partially against the second surface portion 6 and has a colour different from the colour of the second surface portion 6. At least a portion of the edge of the first surface portion 5 that defines the colour transition between the first and the second surface portion is visually sharp so that the colour transition looks nice or tidy and does not need to be hidden from view in a narrow groove. The third surface portion 7 is separated at least locally by the first surface portion 5 from the second surface portion 6 or in other words the first surface portion 5 is situated at least partially in between the second and the third surface portions. The third surface portion 7 may have a colour different from the colour of the first surface portion 5, for example it may have the same colour as the second surface portion 6. In this case, the first surface portion 5 has preferably a further edge forming a visually sharp transition between the first and the third surface portion. However, in a preferred embodiment, the third surface portion 7 has the same colour as the first surface portion 5 so that no sharp edge is required at the transition between the first and the third surface portion.

A preferred embodiment of a method according to the invention for producing such a multicoloured trim part 2 is illustrated in FIGS. 1 to 6. In this method, use is made of a mould having a first 8 and a second mould section 9. The first mould section 8 is intended to produce the surface layer 1 whilst the second mould section 9 enables to close the mould to form a mould cavity wherein the foam backing layer 4 can be produced against the back of the surface layer 1. The first mould section 8 has a mould surface 10 which comprises a first portion 11, arranged to produce the first surface portion 5, a second portion 12, arranged to produce the second surface portion 6 and a third portion 13, arranged to produce the third surface portion 7 of the surface layer 1.

Figure 1:
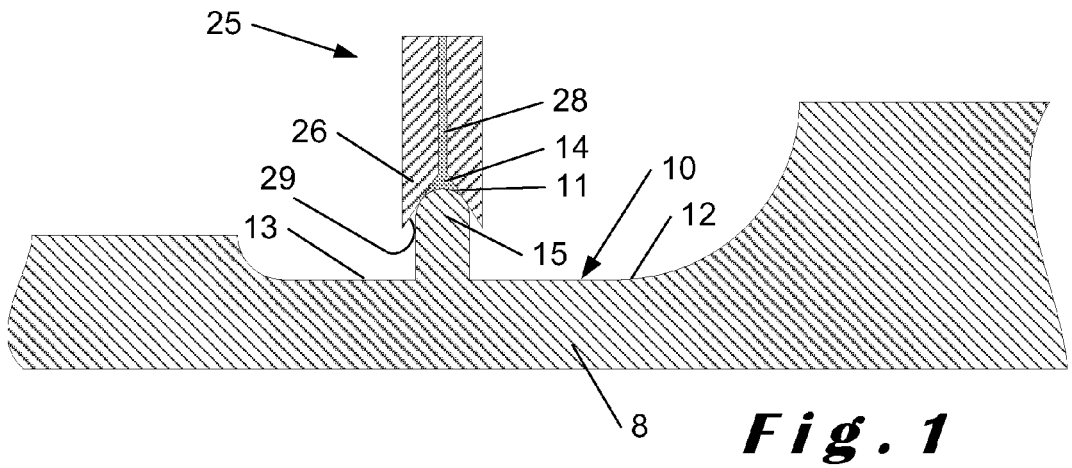
FIGS. 1 to 4 schematically illustrate a method for producing a surface layer of a multilayered trim part according to the present invention.
Figure 2:
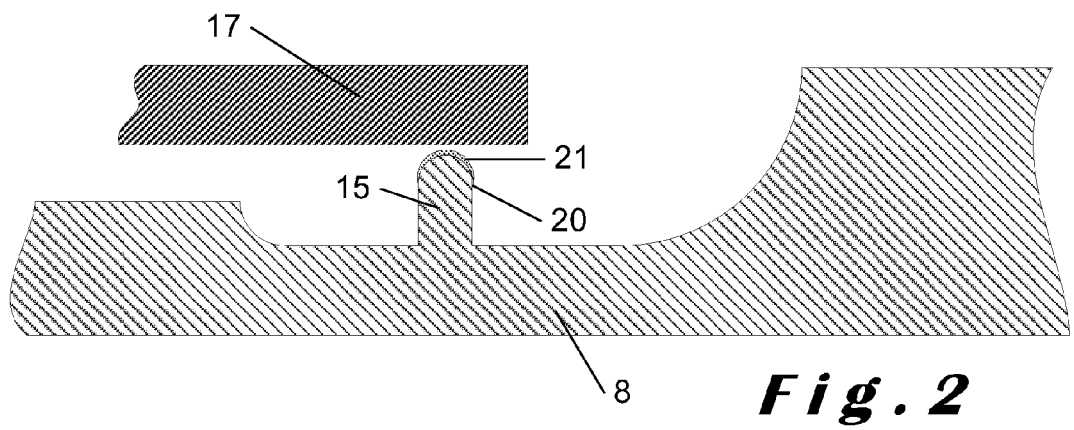
Figure 3:
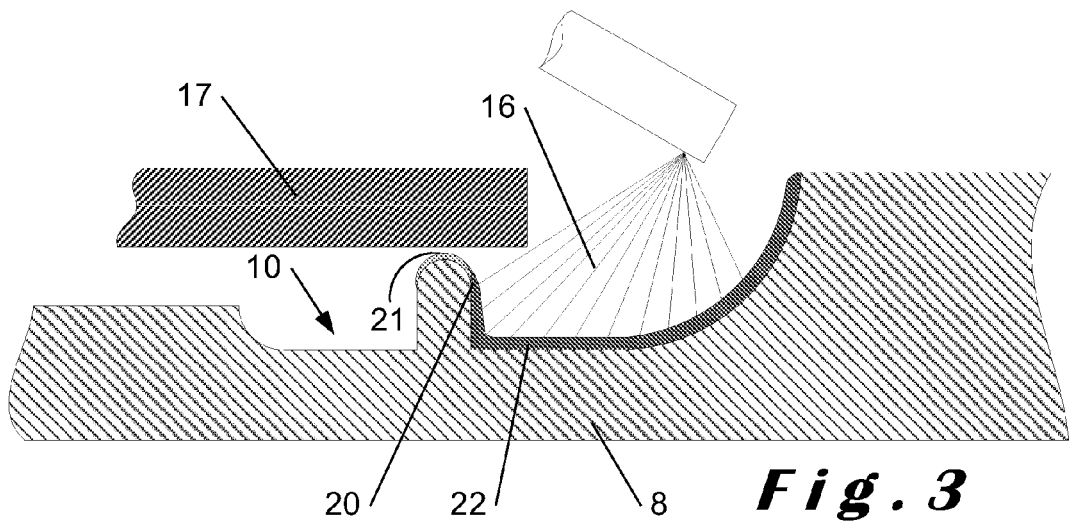
Figure 4:
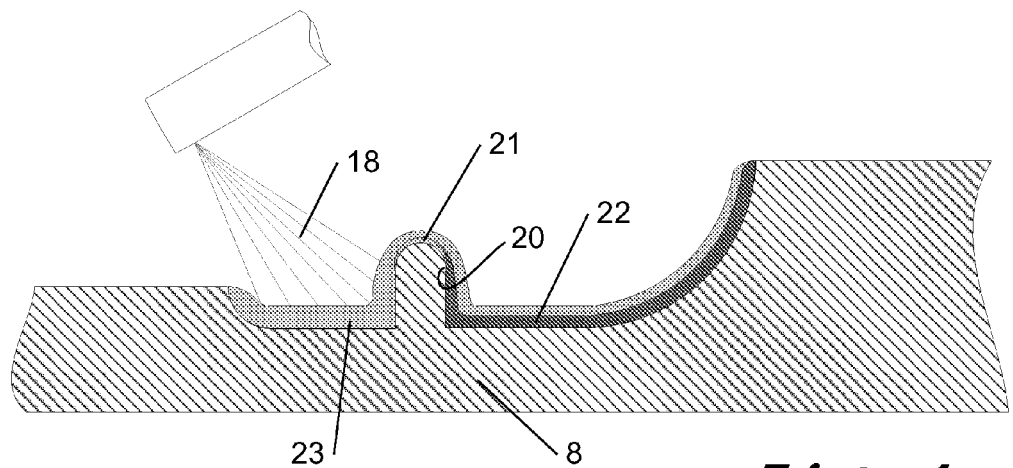

In a first step, illustrated in FIG. 1, a layer of a first layer forming material 14, which is hardenable and has the first colour, is applied, as an in-mould coating, onto the first portion 11 of the mould surface 10. This first portion 11 is situated on top of an upstanding ridge 15 of the mould surface 10. After having applied the first layer forming material 14, a layer of a second layer forming material 16, which is hardenable and has the second colour, different from the first colour, is applied onto the second portion 12 of the mould surface and partially onto the back of the first layer forming material 14 (see FIG. 3). Before applying the second layer forming material 16, the layer of the first layer forming material 14, and preferably also the third portion 13 of the mould surface, are preferably shielded off at least partially by means of a mask 17 (see FIG. 2) so that the second layer forming material 16 can be sprayed from a distance onto the mould surface. In a next step, the mask 17 is removed and a layer of a third layer forming material 18 is applied onto the third portion 13 of the mould surface and at least partially onto the back of the first layer forming material 14. In the embodiment illustrated in FIG. 4, the third layer forming material 18 is also applied partially onto the back of the second layer forming material 16. The third layer forming material 18 can thus be sprayed without having to use a mask. After having applied the different layers of the layer forming materials 14, 16 and 18, each of these layers is allowed to harden, either before or after having applied a subsequent layer, to produce respectively the layers 21, 22 and 23 forming the surface layer 1.

Figure 5:
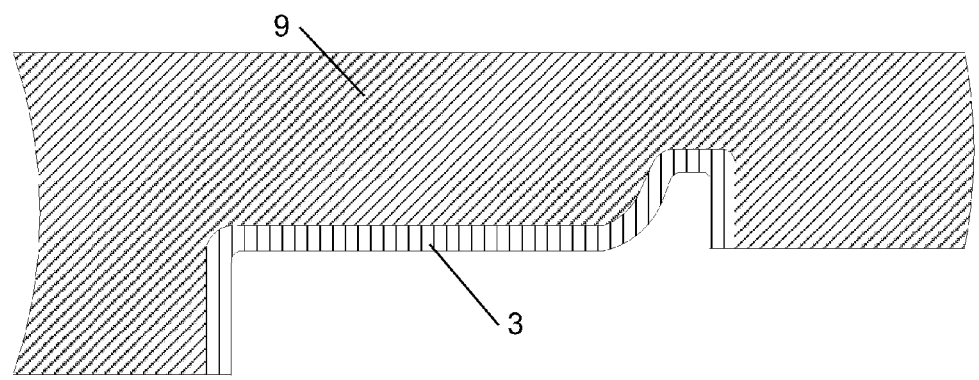
FIGS. 5 and 6 schematically illustrate two further steps to produce the multilayered trim part comprising the surface layer produced by the method illustrated in FIGS. 1 to 4.
Figure 5:
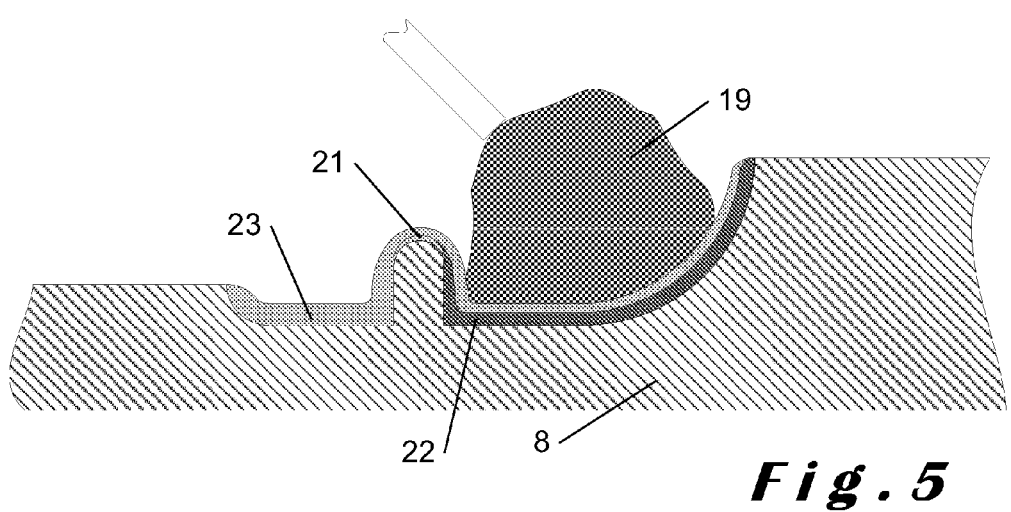
Figure 6:
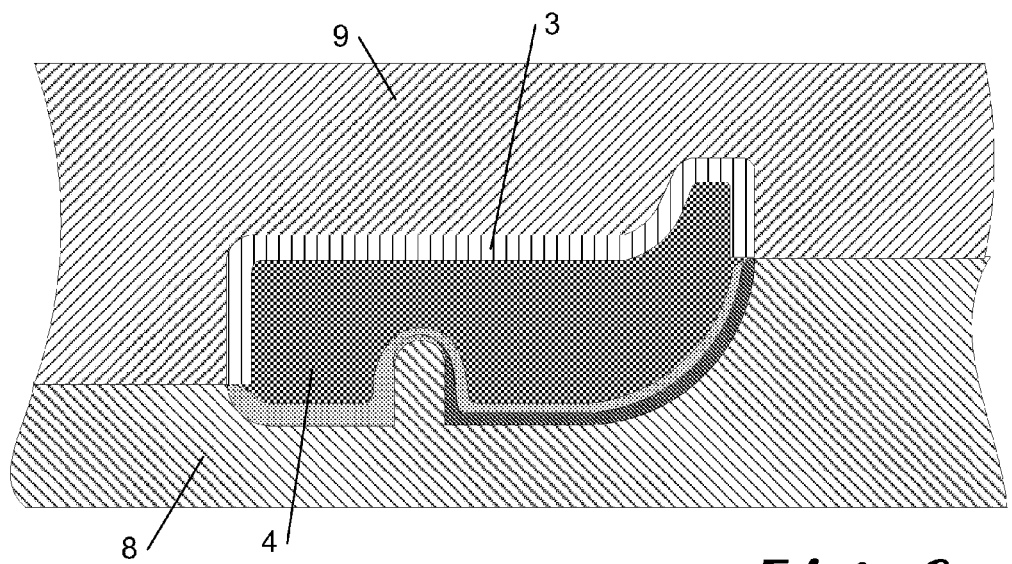

After having produced the surface layer 1, it can be removed from the first mould section 8 and it can subsequently be positioned in a separate backfoaming mould to produce the trim part 2 by a so-called indirect backfoaming process. In FIGS. 5 and 6, a direct backfoaming process is however illustrated wherein the surface layer 1 is left onto the surface 10 of the first mould section 8 and wherein the rigid substrate 3 is positioned onto the second mould section 9. A foamable composition 19 is then poured onto the back of the surface layer 1, the mould is closed and the foamable composition 19 is allowed to foam to fill the space between the surface layer 1 and the rigid substrate 3. After curing of the foam, the mould can be opened and the trim part 2 can be removed from the mould.

In the method illustrated in FIGS. 1 to 4, the second layer forming material 16 was applied after having applied the first layer forming material 14 and the third layer forming material 18 was applied after having applied the second layer forming material 16. It is however also possible to apply the third layer forming material 18 onto the mould surface either before applying the second layer forming material 16 or even before applying the first layer forming material 14 thereon. When applying it before the second layer forming material 16, the third layer forming material 18 is not only applied onto the third portion 13 of the mould surface but also partially onto the back of the layer of the first layer forming material 14. In this case, a mask can be used to shield the layer of the first layer forming material 14, and preferably also the second portion 12 of the mould surface, at least partially off when applying the layer of the third layer forming material 18 whilst a mask is no longer needed for applying the second layer forming material 16. When applying the third layer forming material 18 onto the mould surface 10 before applying the first layer forming material 14 thereon, the first portion 11 of the mould surface is preferably at least partially shielded off by means of a mask when applying the layer of the third layer forming material 18 onto the mould surface. Depending on the width of the first portion 11 of the mould surface also the second portion 12 of the mould surface is preferably at least partially shielded off by means of that mask. Again, a mask is no longer needed for applying the second layer forming material 16 since this material may be sprayed also onto the back of the layer of the third layer forming material 18.

An essential feature of the method according to the invention is that the second layer forming material 16 is not only applied onto the mould surface but also at least partially onto the back of the first layer forming material 14 so that the layer of the first layer forming material 14 has an edge 20 which is situated (on the mould surface) underneath the layer of the second layer forming material 16 and which forms, on the visible side (front side) of the finished surface layer, the transition between the first and the second colour. According to the invention, at least a portion of this visible edge 20 is formed without intervention of a mask when applying the first layer forming material 14 onto the first portion 11 of the mould surface 10. The first layer forming material 14 is more particularly applied in such a manner that this portion of the visible edge 20 is visually sharp. The portion of the visible edge which is visually sharp preferably has a length of at least 5 cm or, if the edge is shorter than 5 cm, preferably the total edge should be visually sharp. Notwithstanding the fact that the visually sharp portion of the edge should be produced without a mask, another portion of the edge could be produced by means of a mask or a mask can be used to cover the second 12 and/or the third portion 13 of the mould surface 10 so that no drops or dirt can arrive onto these portions of the mould surface. The edge of this mask is then situated at some distance from the first portion 11 of the mould surface.

Figure 9:
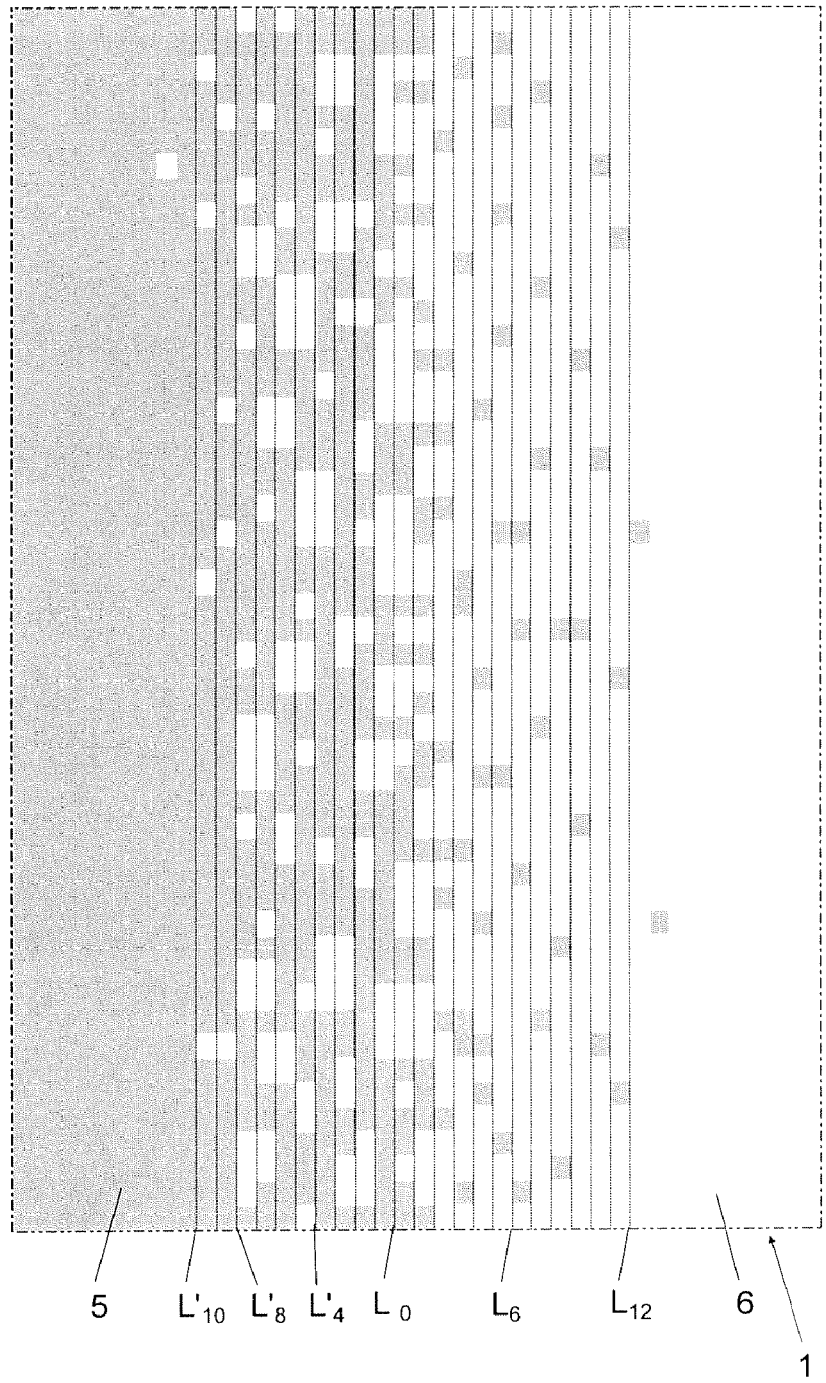
FIG. 9 schematically shows, on a macroscopic scale, the transition between two colours on a surface layer produced by a prior art method wherein the two surface portions of the surface layer are produced by a spray method as described in EP-B-0 804 327.

A visually sharp edge means that the edge is either sharp or comprises a transition zone between the two colours which is however so narrow that, when looking at it with the naked eye in normal daylight and from a distance of 30 cm, the edge appears to be sharp. FIG. 9 illustrates very schematically an edge 20 of a grey first layer 21 which is situated in front of a white second layer 22 and which is not visually sharp. The edge 20 is obtained by spraying the first layer forming material 14 onto the mould surface, the second portion of which is shielded off by means of a mask maintained, as described in EP-B-0 804 327, on a distance from the mould surface. In practice it was found that, in the best cases, the colour transition zone has a width of at least 1100-1200 μm.

In the method according to the invention, the first layer forming material 14 is however preferably applied in such a manner that the edge 20 is produced without a mask and is visually sharp. Preferably, the first layer forming material is applied in such a manner onto the mould surface that there is either substantially no colour transition zone or that the transition zone has a width smaller than or equal to 500 μm, more preferably smaller than or equal to 300 μm and most preferably smaller than or equal to 150 μm. The way wherein the width of the colour transition zone, or the absence of such a colour transition zone, can be determined is illustrated in FIG. 9.

First a line $L_0$ following the contour of the first surface portion 5 should be drawn. If there is a colour transition zone between the first 5 and the second surface portion 6, this contour line $L_0$ should be drawn substantially in the middle of the transition zone. In FIG. 9, the contour line $L_0$ is a straight line but curved contour lines are of course also possible. After having drawn the contour line $L_0$, lines $L_1$-$L_n$ are drawn parallel to the contour line $L_0$ and each time at a distance from this contour line increasing with a step of 50 μm towards the second surface portion 6. When less than 2% of the surface defined between a line $L_n$ and a further line $L_{n+1}$ (drawn parallel to the line $L_n$ at a distance of 50 μm) has the colour of the first surface portion 5, the last line $L_n$ forms the boundary of the transition zone at the side of the second surface portion 6. In the direction of the first surface portion 5, the same is done, i.e. lines $L'_1$-$L'_m$ are drawn at a distance increasing with steps of 50 μm towards the first surface portion 5 until less than 2% of the surface defined between the last line $L'_m$ and a further line $L'_{m+1}$ (drawn parallel to the line $L_m$ at a distance of 50 μm) has the colour of the second surface portion 6. In the embodiment illustrated in FIG. 9, a total of 22 lines L, L' had to be drawn so that the colour transition zone has a width of 1.1 mm. Such a wide transition zone can clearly be seen with the naked eye so that the edge is not visually sharp.

To achieve a visually sharp edge without the use of a mask, the first layer forming material 14 can be applied in different ways onto the mould surface, i.e. different applicator devices can be used. First of all it can be laid onto the mould surface by different techniques such as brushing, scraping, rolling, pouring (with a pouring nozzle drawn over the mould surface), tampon printing, flexography, etc. The first layer forming material 14 may also be applied from a relatively small distance onto the mould surface, in particular from a distance smaller than 20 mm, preferably smaller than 10 mm. This can be done by spraying the material from such a small distance, and with such a pressure and flow rate onto the mould surface, that a visually sharp edge is formed. The first layer forming material can also be poured or otherwise dosed onto the mould surface so that it flows out on the mould surface. A person skilled in the art knows different ways wherein such a visually sharp edge can be achieved without the use of a mask. The first layer forming material can be applied for example by brushing, painting, rolling, writing (with a pen-like instrument) or printing (for example by flexography or by ink jet printing) or even by spraying or pouring if this is done from a sufficiently small distance (and at a sufficiently low pressure or flow rate) from the mould surface.

The first layer forming material 14 has preferably a relatively low viscosity, in particular a viscosity lower than 1000 mPa·s, preferably lower than 500 mPa·s (at 25° C.), so that it can be applied easier onto the mould surface. As illustrated in the figures, the first layer forming material 14 is preferably a water or solvent based paint which is applied in a layer having preferably an average thickness smaller than 300 μm, more preferably smaller than 100 μm.

Figure 10:
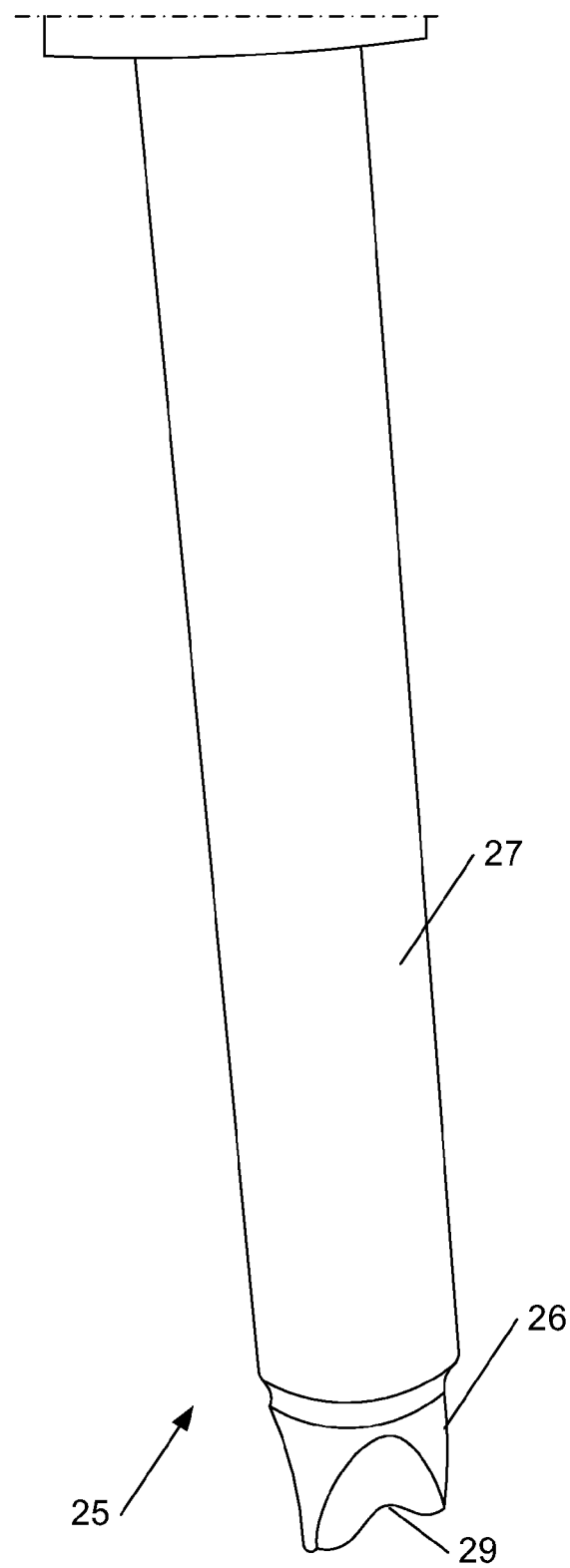
FIG. 10 schematically shows a perspective view of the nozzle used in the method illustrated in FIGS. 1 to 4 to apply, as shown in FIG. 1, the first layer forming material.

As described hereabove, different techniques or applicator devices can be used to apply such a paint onto the mould surface. FIG. 1 shows schematically a cross-sectional view of a possible nozzle 25 of a paint applicator device while FIG. 10 shows a perspective view of this nozzle 25. The nozzle 25 comprises a nozzle tip 26 screwed onto a tube 27. The nozzle tip 26 has a central channel 28 through which the paint is dispensed at a controlled flow rate. In the embodiment illustrated in FIGS. 1 and 10, the nozzle tip 26 has a V-shaped groove 29. For applying the paint onto the mould surface, the nozzle is positioned onto the ridge 15 so that the top of the ridge extends into the groove 29, with a free space remaining between the top of the ridge and the bottom of the groove. The central channel 28 in the nozzle tip 26 ends in the bottom of the groove 29 so that the paint flows into this free space and arrives on top of the ridge 15. The nozzle is moved along the ridge to deposit a layer of paint onto the top of the ridge. The amount of paint is controlled by adjusting the velocity of the nozzle moving along the ridge and the flow rate of the paint through the nozzle. The amount of paint is controlled more particularly in such a manner that the paint flows out over the top of the ridge but does not run off. In this way, a visually sharp edge is obtained.

Instead of a V-shaped groove, other groove shapes can be provided, depending amongst others on the shape of the top of the ridge. The shape and the size of the groove can also be adapted to enable to apply the paint not onto a ridge but onto a substantially flat mould surface. As explained hereabove, a ridge is no longer necessary to provide a groove in the surface layer or trim part wherein the actual colour transition is hidden from view.

The second layer forming material 16 can be a same material as the first layer forming material 14 but having a different colour. It can thus also be a water or solvent based paint which is applied in a layer having preferably an average thickness smaller than 300 μm, in particular smaller than 100 μm. In the trim part, this in-mould paint layer can be given the required support by moulding a foam layer of a sufficiently high density onto the back of the paint layer. However, in a preferred embodiment, at least one elastomeric skin layer is applied onto the back of the paint layer to form, together with the paint layer, the surface layer. This elastomeric skin layer has in particular an average thickness greater than 0.4 mm, preferably greater than 0.6 mm but smaller than 8 mm, preferably smaller than 6 mm and more preferably smaller than 4 mm (the average thickness is determined by dividing the volume of the skin layer by its surface area).

Instead of applying first an in-mould coating layer, i.e. a paint layer, it is also possible to apply directly, as illustrated in the figures, a curable skin material, in particular a curable polyurethane skin material, forming after curing a non-cellular or micro-cellular elastomeric skin layer, as second layer forming material 16 onto the mould surface 10. Since it is not covered by a paint layer, this skin material should preferably be light-stable. Suitable polyurethane formulations, which can be sprayed onto the mould surface, are disclosed in EP-B-0 379 246. These formulations can be sprayed for example by the techniques described in EP-B-0 303 305 and in EP-B-0 389 014. On the other hand, it is also possible to apply these formulations by pouring them on the mould surface. The polyurethane formulations can also be moulded in accordance with a reaction injection moulding process (RIM). Suitable RIM formulations are disclosed in EP-B-0 929 586. They can be moulded for example by a RIM process as disclosed in WO 02/11974. The layer of the second layer forming material is however preferably applied by spraying or pouring this material, which is preferably a curable liquid, onto the mould surface.

The skin material which is either applied directly onto the mould surface or onto an in-mould coating may also be a thermoplastic material. The layer or this thermoplastic material can be applied by the usual moulding methods such as the powder or liquid slush moulding processes to produce flexible moulded sheets or panels of thermoplastic materials such as PVC. In these methods, the thermoplastic material is at least partially melted, in particular until at least a gel is obtained, and allowed to harden so that it adheres to the previously applied layer(s).

For applying the third layer forming material 18, the same materials and application techniques can be used as described here above for the second layer forming material 16. The third layer forming material 18 is preferably of the same nature as the second layer forming material 16, for example a curable polyurethane composition, but they may also be of a different nature. Moreover, both materials may be applied by a different technique.

Especially when the third layer forming material has substantially the same colour as the first layer forming material, the edge of the layer of the third layer forming material does not have to be visually sharp whilst the edge of the first layer forming material is preferably visually sharp. In this case, the first layer forming material is preferably applied by means of an applicator device which enables to achieve a visually sharp edge without intervention of a mask whilst the third layer forming material is preferably applied by means of another applicator device, more particularly by means of an applicator device, in particular a spray device, which enables to spread the third layer forming material more easily over a larger surface area.

The third layer forming material 18 can be applied before the first layer forming material 14, after this first layer forming material 14 but before the second layer forming material 16, or after the second layer forming material 16. In the preferred embodiment illustrated in the figures, the third layer forming material 18 is a curable skin material which is not only applied onto the third portion 13 of the mould surface but also on the back of the layer of the first layer forming material 14 so that it provides a support layer for this paint layer. More generally, it is preferable to apply the first layer forming material first onto the mould surface, i.e. before the second and any third layer forming material, since it is easier to apply this first layer forming material by means of the techniques enabling to achieve a visually sharp edge onto a mould surface which isn't covered yet with any of the other materials.

If both the second and the third layer forming material are a water or solvent based paint, and if a micro-cellular or non-cellular skin layer is applied on both paint layers, the paint layers are preferably applied first onto the mould surface so that the skin layer can be applied in one step onto all of the paint layers (including the first layer forming material which may also be a paint layer).

The surface layer formed by any paint and/or elastomeric skin layers is preferably flexible or semi-flexible. It has in particular an average thickness greater than 0.4 mm, preferably greater than 0.6 mm but smaller than 8 mm, preferably smaller than 6 mm and more preferably smaller than 4 mm.

The invention claimed is:

1. A method for manufacturing at least a surface layer (1) of a multilayered trim part (2), which surface layer (1) has a front side formed at least partially by a first surface portion (5), which has a first colour, and by a second surface portion (6), which is situated at least partially against the first surface portion (5) and which has a second colour different from the first colour, the method comprising the steps of:

providing a mould (8, 9) with at least one mould surface (10) comprising a first portion (11), arranged to produce the first surface portion (5) of the surface layer (1), and a second portion (12) which is situated at least partially against the first portion (11) of the mould surface (10) and which is arranged to produce the second surface portion (6) of the surface layer (1);

applying a layer of a first layer forming material (14), which is hardenable and has the first colour, onto the first portion (11) of the mould surface (10) while leaving the second portion (12) of the mould surface free for applying a layer of a second layer forming material (16) thereon;

applying the layer of the second layer forming material (16), which is hardenable and has the second colour, onto the second portion (12) of the mould surface (10) and at least partially onto the back of the layer of the first layer forming material (14), the layer of the first layer forming material (14) having an edge (20) situated underneath the layer of the second layer forming material (16);

allowing the layers of the first (14) and the second layer forming materials (16) to harden to produce a first (21) and, respectively, a second layer (22) against the mould surface (10) forming the first (5) and, respectively, the second surface portions (6) of the surface layer (1); and removing the produced surface layer (1) from the mould surface (10), characterised in that when applying the first layer forming material (14) onto the first portion (11) of the mould surface (10) at least a portion of said edge (20) is formed without intervention of a mask and is visually sharp so that it comprises either no transition zone, defined between a first line ($L_{12}$), drawn parallel to a contour line ($L_0$) of the first surface portion (5) at such a distance, which is a multiple of 50 µm, from the contour line (Lo) towards the second surface portion (6) that, if a further line is drawn 50 µm further away from the contour line ($L_0$) and again parallel thereto, less than 2% of the surface defined between the first line ($L_{12}$) and the further line has the first colour, and a second line ($L'_{10}$), drawn parallel to the contour line ($L_0$) at such a distance, which is a multiple of 50 µm, from the contour line ($L_0$) towards the first surface portion (5) that, if a further line is drawn 50 µm further away from the contour line ($L_0$) and again parallel thereto, less than 2% of the surface defined between the second line ($L'_{10}$) and the further line has the second colour or, if the visually sharp edge (20) comprises such a transition zone, the transition zone has a width, measured perpendicular to the contour line (Lo), smaller than or equal to 500 µm;

and a layer of a third layer forming material (18), which is hardenable and has a third colour different from the second colour, is applied onto a third portion (13) of the mould surface (10), which is separated at least locally by the first portion (11) of the mould surface from the second portion (12) thereof, and the layer of the third layer forming material (18) is allowed to harden to produce a third layer (23) forming a third surface portion (7) of the surface layer (1) which is separated at least locally by the first surface portion (5) of the surface layer from the second surface portion (6) thereof, the layer of the third layer forming material (18) being either applied onto the mould surface (10) before applying the layer of the first layer forming material (14) thereon, in which case the first layer forming material (14) is applied at least partially onto the back of the layer of the third layer forming material (18), or after having applied the layer of the first layer forming material (14) thereon, in which case the third layer forming material (18) is applied at least partially onto the back of the layer of the first layer forming material (14).

2. A method according to claim 1, characterised in that the first colour is the same as the third colour.

3. A method according to claim 1, characterised in that the third material is applied by means of an applicator device which is different from the device used to apply the first material.

4. A method according to claim 1, characterised in that the layer of the first layer forming material (14) is applied on the mould surface (10) before applying the layer of the third layer forming material (18) thereon.

5. A method according to claim 4, characterised in that the layer of the third layer forming material (18) is applied onto the mould surface (10) and also at least partially onto the back of the first layer forming material (14) before applying the layer of the second layer forming material (16) on the mould surface (10) and the layer of the first layer forming material (14) is at least partially shielded off by means of a mask when applying the layer of the third layer forming material, or the layer of the second layer forming material (16) is applied onto the mould surface (10) and also at least partially onto the back of the first layer forming material (14) before applying the layer of the third layer forming material (18) on the mould surface (10) and the layer of the first layer forming material (14) is at least partially shielded off by means of a mask (17) when applying the layer of the second layer forming material (16).

6. A method according to claim 1, characterised in that the third layer forming material (18) is a curable skin material (18) forming after curing an elastomeric skin layer (23).

7. A method according to claim 6, characterised in that the curable skin material (18) is sprayed or poured onto the mould surface (10) or the curable skin material is injected in a closed mould cavity formed partially by the mould surface (10).

8. A method according to claim 1, characterised in that the third layer forming material (18) is a thermoplastic skin material which is moulded in an at least partially molten state against the mould surface (10).

9. A method according to claim 1, characterised in that the third layer forming material (18) is a water or solvent based paint.

10. A method according to claim 9, characterised in that after having applied the paint layer onto the mould surface (10), at least one layer of a curable material, in particular a polyurethane material, and/or at least one layer of a thermoplastic material is applied onto the back thereof.

11. A method according to claim 1, characterised in that the second layer forming material (16) is a curable skin material (16), in particular a curable polyurethane skin material, forming after curing an elastomeric skin layer (22).

12. A method according to claim 11, characterised in that the curable skin material (16) is sprayed or poured onto the mould surface (10) or the curable skin material is injected in a closed mould cavity formed partially by the mould surface (10).

13. A method according to claim 1, characterised in that the second layer forming material (18) is a thermoplastic skin material which is moulded in an at least partially molten state against the mould surface (10).

14. A method according to claim 1, characterised in that the second layer forming material (16) is a water or solvent based paint.

15. A method according to claim 14, characterised in that after having applied the paint layer onto the mould surface (10), at least one layer of a curable material, in particular a polyurethane material, and/or at least one layer of a thermoplastic material is applied onto the back thereof.

16. A method according to claim 1, characterised in that the layer of the first layer forming material (14) is applied by laying the first layer forming material (14) on the mould surface or by applying the first layer forming material (14) from a distance smaller than 20 mm onto the mould surface (10).

17. A method according to claim 1, characterised in that the layer of the first layer forming material (14) is applied by an application technique selected from the group consisting of brushing, painting, rolling, writing and printing.

18. A method according to claim 1, characterised in that the first layer forming material (14) is a water or solvent based paint (14).

19. A method according to claim 1, characterised in that after having produced the surface layer (1), a complex is made with a rigid substrate (3).

20. A method according to claim 1, characterised in that the mould surface (10) comprises an upstanding ridge (15) onto which the first (11) and the second portion (12) of the mould surface (10) contact one another so that at least a portion of the edge (20) of the first layer forming material (14), which is situated underneath the layer of the second layer forming material (16), is situated on the upstanding ridge (15).

21. A method according to claim 1, characterised in that the width of said transition zone is smaller than or equal to 300 µm.

22. A method according to claim 21, characterised in that the width of said transition zone is smaller than or equal to 150 µm.

23. A method according to claim 9, characterised in that said paint is applied in a layer having an average thickness smaller than 300 µm.

24. A method according to claim 14, characterised in that said paint is applied in a layer having an average thickness smaller than 300 µm.

25. A method according to claim 16, characterised in that the first layer forming material (14) is applied by spraying or pouring from said distance onto the mould surface (10).

26. A method according to claim 18, characterised in that said paint is applied in a layer having an average thickness smaller than 300 µm.

* * * * *